Aug. 18, 1953 A. A. TIMLIN 2,649,218
HYDRAULIC ELEVATING AND TRANSPORT TRAILER
Filed Dec. 19, 1951 3 Sheets-Sheet 2
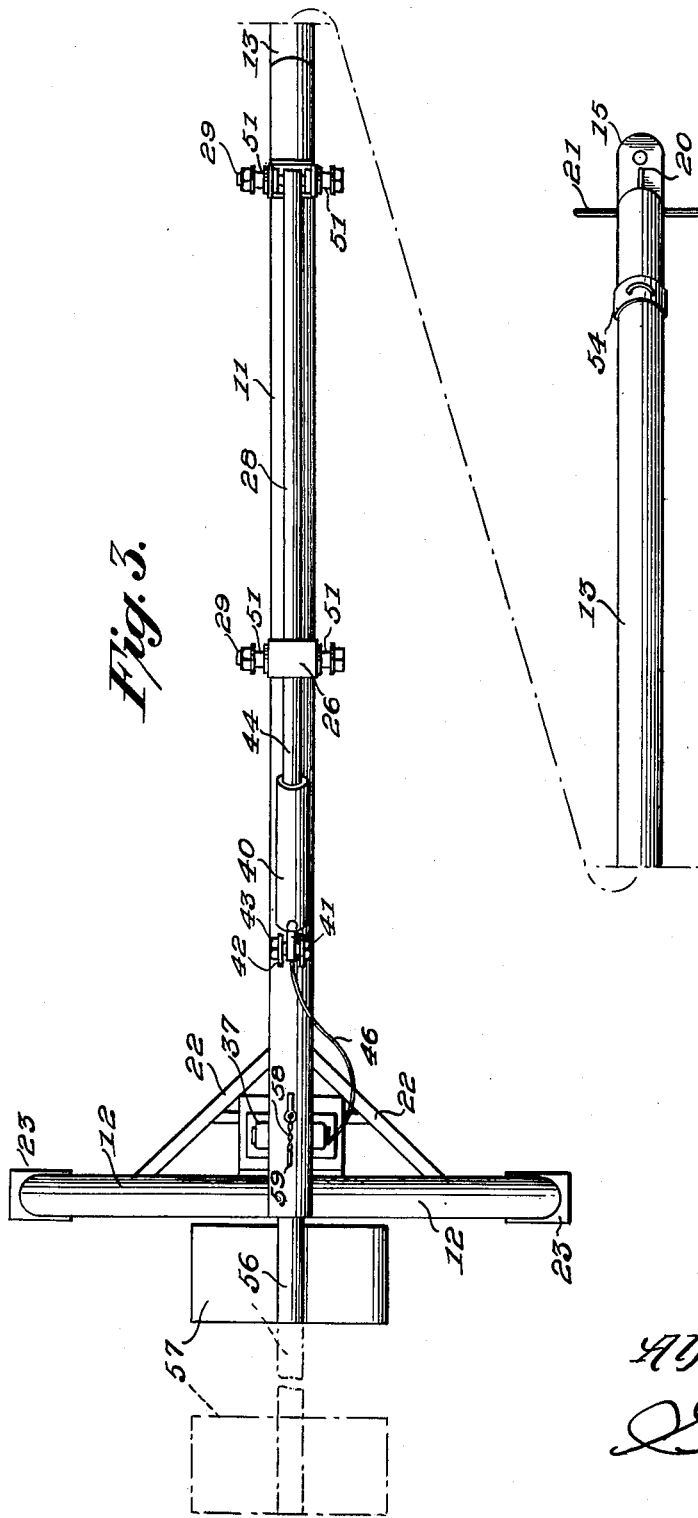

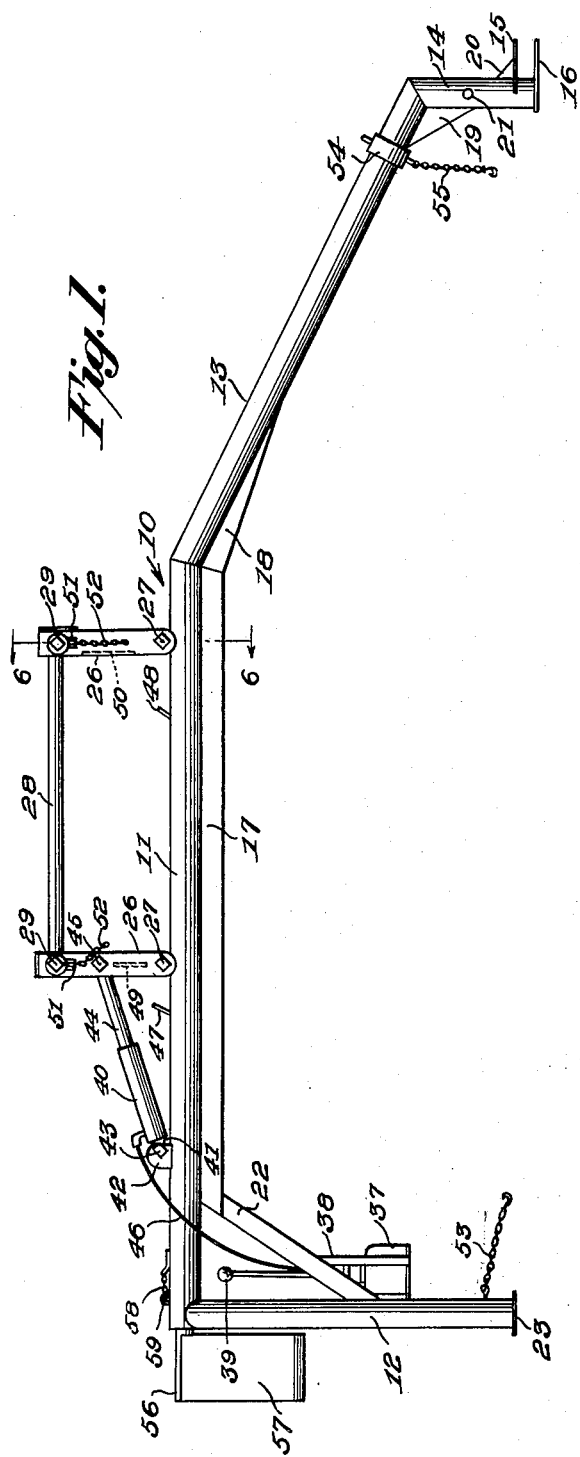

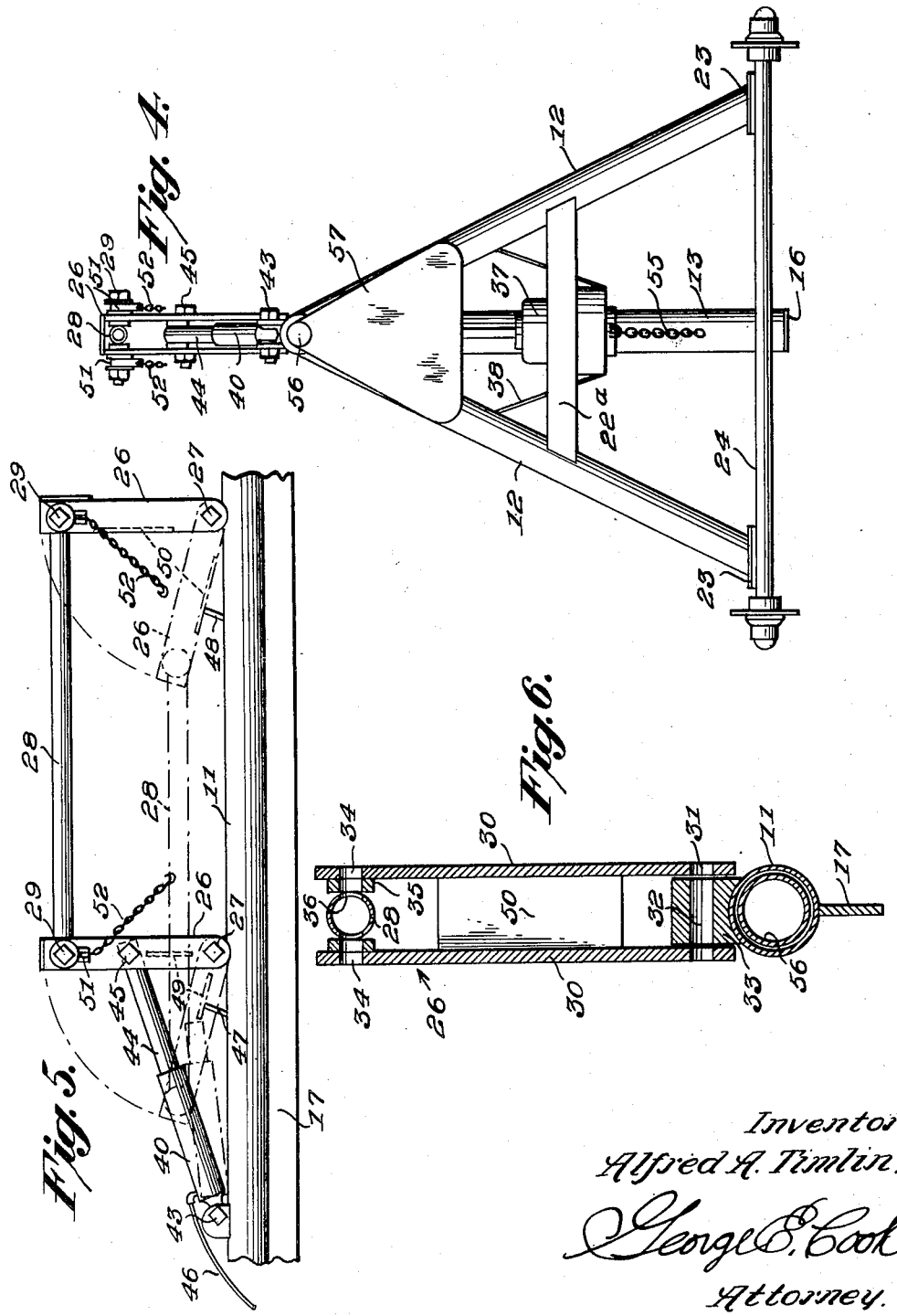

Patented Aug. 18, 1953

2,649,218

UNITED STATES PATENT OFFICE 2,649,218

HYDRAULIC ELEVATING AND TRANSPORT TRAILER

Alfred A. Timlin, De Land, Fla.

Application December 19, 1951, Serial No. 262,463

3 Claims. (Cl. 214—394)

This invention relates to an article elevating and transporting trailer.

The invention is more particularly concerned with a trailer adapted to be towed by a tractor or other power device and which includes power operated means for elevating and supporting structures, such as farm implements for the transport thereof from place to place as desired.

The improved trailer forming the subject matter of the present invention is of the general structure disclosed in U. S. patent to J. Eaves, Jr., et al. No. 2,496,153, granted January 31, 1950, but involves several structural improvements over the patented structure as will appear in the following disclosure.

A primary object of the present invention is to provide an implement elevating and transporting trailer which includes a pair of longitudinally spaced elevating means whereby implements may have lifting movements applied thereto at spaced points for maintaining substantial equilibrium of the implement during the elevation and transportation thereof.

A further object of the invention is to provide an implement elevating and transporting trailer including an elongated frame having a pair of supporting wheels adjacent one end thereof and a tractor hitch adjacent the opposite end thereof, the frame supporting lifting mechanism intermediate its ends and the trailer further including adjustable balancing means disposed rearwardly of the supporting wheels.

A still further object of the invention is to provide an elevating and transporting trailer wherein the elevating means including one or more arms swingable in a vertical plane and to which are attached implement engaging chains and the arm or pair of arms being operable by a single manually operable hydraulic unit and wherein the vertical range of movement of the arm or arms is substantially greater than the length of the axial stroke of the operating piston of the hydraulic unit.

Other objects and advantages of the invention will become apparent in the course of the following detailed description taken in connection with the accompanying drawings, wherein—

Figure 1 is a side elevational view of the improved elevating and transporting trailer in accordance with a preferred structural embodiment thereof with the supporting wheels omitted.

Figure 2 is a view similar to Figure 1 but on a reduced scale and showing the trailer in operation.

Figure 3 is a substantially enlarged top plan view of the trailer shown in Figure 1, the dot-and-dash line indicating the lower portion in the figure as being an axial continuation of the right hand end of the major upper portion.

Figure 4 is a rear end elevational view on the same scale as Figure 3.

Figure 5 is a fragmental side elevational view showing the elevating action of the lifting means.

Figure 6 is a vertical sectional view in the plane of line 6—6 on Figure 1.

Referring now in detail to the drawings, the improved trailer comprises a frame 10 which preferably includes an elongated horizontal tubular portion 11, which at one end thereof is supported by a pair of cylindrical legs 12 whose upper ends are rigidly secured to the tubular portion 11 as by welding or other suitable means.

The frame further includes a forward cylindrical portion 13 which is rigid with portion 11 and inclines downwardly from the front end thereof. The inclined portion 13 at its lower end is rigidly connected to the upper end of a relatively short vertical cylindrical portion 14 and rigidly secured to the portion 14 adjacent its lower end is a hitch plate 15 and a foot plate 16. The frame is reinforced by means of a rib or fin 17 rigidly secured to the lower wall of portion 11 in the vertical axial plane thereof and such fin is extended by a secondary fin 18 rigidly secured to the lower wall of the inclined portion 13 for a substantial distance adjacent its upper end. Furthermore a triangular web or fin 19 is rigidly supported within the angle defined by adjacent ends of portions 13 and 14 and a smaller triangular web 20 is rigidly supported in the angle defined by portion 14 and the hitch plate 15. The vertical portion 14 of the frame is provided with a handle 21 which as shown in Figure 3 extends laterally on both opposite sides of such portion.

The frame further includes a pair of brace bars 22 whose lower ends are rigidly secured to legs 12 and which converge upwardly and have their adjacent upper ends rigidly secured to the web 17. Also a brace bar 22a interconnects the legs 12 and is shown in Fig. 4.

An axle saddle plate 22 is rigidly connected to the lower end of each leg 12 and which are in turn rigidly connected to an axle 24 which at its opposite ends rotatably supports wheels 25, the hub portions of which are shown in Figure 4.

The implement elevating and supporting means comprises a pair of arms 26 whose lower ends are pivotally connected to the frame portion 11 in horizontally spaced relation as by means of bolts 27 and the arms adjacent their upper ends are pivotally connected to opposite ends of a bar 28 as by means of bolts 29.

The arms are adapted for simultaneous swinging movement about the pivot bolts 27 from the full line positions of Figures 1 and 5 to the dotted line position of Figure 5 and vice versa. The bar 28 is always parallel with frame portion 11 and the arms 26 remain parallel in any angular relation thereof to the frame portion 11.

The arms 26 are preferably each formed by a pair of laterally spaced plates 30 (Figure 6) whose lower ends are apertured as at 31 for receiving the pivot bolts 27 and which bolts extend through apertures 32 in bearing blocks 33 rigidly secured to the upper wall of frame portion 11.

The upper ends of the plates are provided with alined apertures 34 through which the bolts 29 extend and such bolts further extend through spacer blocks 35 and diametrical apertures 36 in the bar 28 which is preferably tubular as shown in Fig. 6.

The arms 26 are simultaneously operable by means of a hand operable hydraulic pump 37 which is supported by a cradle 38 which is rigidly supported by the bars 22 and the pump includes an operating handle 39.

A hydraulic ram is provided and which comprises a cylinder 40 whose closed end is provided with an apertured ear 41 extended between a pair of lugs 42 projecting upwardly from the frame portion 11 and pivotally connected thereto as by means of a bolt 43. The ram further comprises a piston rod 44 whose free end extends between the plates 30 of the adjacent arm 26 and is pivotally connected thereto as by means of a bolt 45.

The pump 37 is in fluid connection with the ram cylinder 40 by means of a flexible conduit 46.

The frame portion 11 is provided with upwardly projecting stop members 47 and 48 adapted to engage stop and spacing plates 49 and 50 extending transversely between the plates 30 of the rear and front elevating arms 26 respectively as is indicated in the dotted position of the arms in Figure 5. A chain clamp 51 is supported by bolts 29 at each opposite side of each arm 26 and an implement engageable chain 52 depends from each of the clamps. A pair of implement engageable chains 53 have corresponding ends thereof secured to the legs 12.

An adjustable collar 54 is supported on frame portion 13 and to which is secured one end of an implement engageable chain 55. Balancing means are provided and which comprise a tubular bar 56 telescopically engaged within the tubular frame portion 11 and which at its outer end rigidly supports a relatively large weight or counterbalance 57. As a means of retaining the bar 56 in any axially adjusted position, the frame portion 11 adjacent its rear end is provided with a chain 58 which at its free end carries a pin 59 engageable within an aperture in the upper wall of the frame portion 11 and selectively in axial spaced apertures in bar 56.

With reference to Figure 5 it will be noted that upon activation of the hydraulic ram, the arms 26 will move downwardly along the dot-and-dash area thus positioning the chains 52 for engagement thereof with implements, such as duplex weed choppers indicated at W in Figure 2 at which time the trailer may be connected to the tractor T by means of a pin 60 engaged through plate 15 and the drawbar of the tractor.

When the chains 52 have been engaged with the load the hydraulic ram is operated and the arms 26 are raised to their vertical positions with a resulting elevating of the load after which the chains 53 and 55 may be connected to the lead.

The counterweight 57 may be adjusted to balance the load with respect to the supporting wheels 25 thereby rendering handling of the trailer easy and in fact operable by a single attendant.

It is to be particularly observed that the vertical lift of the arms 26 from the lower position to the upper position in Figure 5 is substantially greater than the stroke of the piston rod 44 effecting such lift which together with the double lift and single power unit are decided advantages in structures of this kind.

While the invention is above described in accordance with a preferred structural embodiment thereof, it is nevertheless, within the scope of the invention to utilize a single arm 26 for the handling of single section implements and it may be of advantage to utilize more than two arms in the handling of certain other implements.

Furthermore, power means, other than hydraulic may be utilized and which may be hand operable or operable by some primary power means.

While I have disclosed my invention in accordance with a single specific structural embodiment thereof, such is to be considered as illustrative only, and not restrictive, the scope of the invention being defined in the subjoined claims.

What I claim and desire to secure by U. S. Letters Patent is:

1. An implement transporting trailer comprising an elongated frame including an upper horizontal tubular member, a pair of legs having their upper ends rigidly connected to said tubular member adjacent one end thereof, said legs diverging downwardly from said tubular member, a pair of supporting wheels carried by the lower ends of said legs, said frame further including a downwardly inclined portion extending from the other end of said tubular member and a relatively short vertical portion rigid with and depending from the lower end of said downwardly inclined portion, a hitch plate carried by said vertical portion, implement elevating means comprising a pair of parallel arms having corresponding ends thereof pivotally connected to said tubular member at longitudinally spaced points intermediate the ends thereof, the opposite ends of the arms being pivotally connected by a bar disposed parallel with said tubular member, automatic power means supported by said tubular member and operatively engaged with one of said arms for moving both arms jointly in a vertical plane toward and away from said tubular member, implement engaging chains carried by said opposite ends of the arms, and balancing means comprising an elongated cylindrical bar telescopically adjustable within said tubular member and projecting from said one end thereof and a relatively large counterbalance weight on the outer end of said bar.

2. The structure according to claim 1 wherein said power means comprising a manually controllable hydraulic ram having a piston rod pivotally connected to one of said arms intermediate the ends thereof whereby the range of vertical movement of said opposite ends of the arms is substantially greater than the stroke of the piston rod in effecting such movement.

3. The structure according to claim 1 together with a pair of implement engaging chains carried having corresponding ends thereof connected to respective ones of said legs, a collar adjustably supported on said inclined portion, and an implement engaging chain having one end thereof secured to said collar.

ALFRED A. TIMLIN.

References Cited in the file of this patent

UNITED STATES PATENTS

| Number | Name | Date |
|---|---|---|
| 1,877,373 | Cohen-Venezian | Sept. 13, 1932 |
| 1,985,169 | Howell et al. | Dec. 18, 1934 |
| 2,399,304 | Watkins | Apr. 30, 1946 |
| 2,433,822 | Bartholomew | Dec. 30, 1947 |
| 2,496,153 | Eaves, Jr. et al. | Jan. 31, 1950 |
| 2,500,700 | Niles | Mar. 14, 1950 |

FOREIGN PATENTS

| Number | Country | Date |
|---|---|---|
| 19,528 | Great Britain | Aug. 25, 1909 |